INVENTOR.
HOWARD NOYES

Patented Oct. 10, 1950

2,524,823

UNITED STATES PATENT OFFICE 2,524,823

FILLERCAP AND ADAPTER FOR LIQUID CONTAINERS

Howard Noyes, Dayton, Ohio

Application June 24, 1948, Serial No. 34,995

7 Claims. (Cl. 220—40)

(Granted under the act of March 3, 1883, as amended April 30, 1928; 370 O. G. 757)

The invention described herein may be manufactured and used by or for the United States Government for governmental purposes without payment to me of any royalty thereon.

The present invention relates to a filler cap and adapter for liquid containers and particularly for use on aircraft fuel tanks.

The primary object of the invention is to provide a flush mounting filler cap for aircraft fuel tanks embodying efficient sealing means to prevent escape of liquid fuel or vapor. A related object is to provide a flush mounting cap suitable for closing any access opening in an aircraft structure.

A further object of the invention is to provide a cap and cap adapter structure wherein the cap is sealed in an efficient manner at all times by the use of resilient gaskets under compression and wherein any internal pressure tending to lift the cap does not destroy the sealing action of the resilient gaskets.

Another object of the invention is to provide a filler cap and cap adapter having an efficient closing action, having a minimum of weight and including a visual indicating means to show at a glance whether the cap is correctly installed within the cap adapter.

Another object of the invention is to generally improve the construction and operating efficiency of filler caps as used on liquid fuel tanks and other fluid-tight containers.

The above and other objects of the invention will become apparent upon reading the following detailed description of the invention in conjunction with the accompanying drawings, in which.

In aircraft construction the fuel storage tanks merit very serious consideration because of the combustible nature of engine fuel. An element which is especially important is the tank filler opening and the closure for association therewith. The closure or cap must not only prevent any possible leakage of liquid fuel or vapor to the outside but must also resist internal air pressure brought about by pressurizing of the tank to insure flow of fuel to the engine or to the fuel pump. The filler cap should be easily removed and installed and should embody visual indication that the cap is properly installed.

Figure 2:
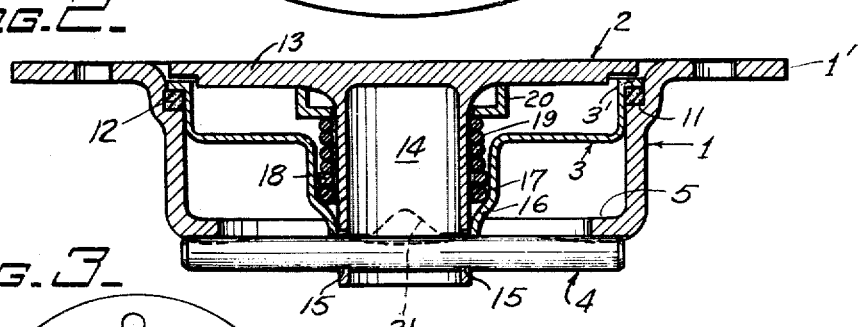
Fig. 2 is a vertical cross sectional view of the filler cap and cap adapter taken on the line 2—2 of Fig. 1.

For a description of a filler cap and cap adapter possessing many advantages reference is now made to the drawing. The adapter and cap arrangement includes four principal parts, namely an adapter 1, primary cap member 2, secondary cap member 3 and locking or securing pin 4. The adapter 1 includes a mounting flange 1' having a series of bolt holes therein in order to secure the adapter to the top wall of a fuel tank apertured to receive the depending portion of the adapter. The lower end of the adapter is flanged inwardly at 5 and this flange is notched at two diametrically opposite points, as indicated at 6, so as to allow the locking pin 4 to clear the lower flange on insertion of the cap member into the adapter. Adjacent to one of the notches 6 there is a stop member 7 integral with the flange 5. At about 90° from the stop member 7, the flange 5 carries an anchor pin 8 having a chain 9 secured thereto and the chain extends at its other end to a ring 10 surrounding the locking pin 4. Thus the cap structure comprising members 2, 3 and 4 can not become separated from the adapter, and thereby is prevented from falling to the ground during tank filling operations. Near the mounting flange 1', the adapter is provided with an annular shoulder 11 forming one sealing surface for the cap in cooperation with a soft rubber gasket 12 preferably carried on the secondary cap member 3. The gasket 12 is made of a highly compressible rubber or plastic material and is preferably made of uni-cellular sponge rubber. As shown in Fig. 2 the gasket 12 is compressed to about one-half its normal thickness. The uni-cellular type of sponge rubber available from many manufacturers is preferred, because the tiny air spaces throughout the material are not interconnected and such material will not allow seepage of liquid fuel or other fluids. The gasket 12 may in some cases be made in the form of an endless rubber tube with the central passage having a diameter about equal to the wall thickness. The gasket 12 preferably has such a circumference as to require stretching of the rubber in mounting the gasket around the secondary cap member 3, since this will help to retain the gasket in assembled relation with respect to the cap member.

The primary cap member 2 includes a circular wall or closure portion 13 and a connected hollow post or tubular section 14 depending from the closure portion. At the lower end portion of the post 14 there is a pair of diametrically opposite holes of a diameter to receive the securing pin 4. In order to accurately locate the pin with respect to the post 14 the lower side of the pin is notched at 15 so as to received portions of the post adjacent to the diametrically opposite holes. The pin may be made secure after assembly by providing a small welded joint between the pin and the post. In any case the pin 4 will be properly located with respect to the post 14 by merely inserting the pin through the opposite holes in the post until the walls of the post are forced into the notches 15 by spring pressure exerted by a coil spring presently to be described.

The secondary cap member 3 includes an upper sealing flange 3' adapted to contact the upper side of gasket 12, which gasket may be cemented or otherwise secured to the flange 3' so as to always stay with the secondary cap member upon removal of the cap structure from the adapter 1. The cap member 3 extends downwardly and inwardly to closely surround or embrace the hollow post 14, on which the member 3 is slidably and rotatably mounted. Above its lower end the member 3 flares outwardly at 16 and also extends upwardly to provide an annular space between the member 3 and post 14. The lower part of this space narrows gradually and receives a rubber O-ring 17, having a metal washer 18 and a coil spring 19 pressing downwardly thereon. The upper end of the coil spring seats on a washer 20 fitted around the upper end of post 14. As may be seen in Fig. 2 the spring 19 always tends to force the ring 17 down into the tapering annular space inside the flared wall portion 16 of cap member 3. Also any tendency of the member 3 to be forced upwardly due to internal fluid pressure will tend to further wedge the ring or gasket 17 into tighter engagement with the contiguous portions of cap members 2 and 3. The lower end of the cap member 3 is provided with a pair of diametrically opposite notches 21, having sloping sides as shown in Fig. 2. These notches always line up with the locking pin 4 in the Open position of the primary cap member 2, as will be explained below. It is noted that the primary and secondary cap members 2 and 3 are slidably as well as rotatably connected at the central interfitting portions thereof. Another feature as shown in Fig. 2 is the provision of an undulating lower face on the flange 5 of adapter 1, to yieldably retain the locking pin 4 in a plurality of rotative positions by the action of coil spring 19 acting through the post 14 on the locking pin. By locating the high point of two opposite undulations at the edges of notches 6, the locking pin 4 will always tend to work itself away from the notches rather than toward the notches.

Figure 3:
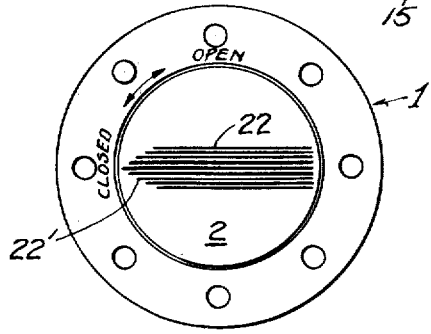
Fig. 3 is a top plan view of the filler cap and cap adapter on a reduced scale, and like the other views shows the cap in its closed position.

Reference is now made to Fig. 3 for an illustration of the cap and adapter as seen from outside the fuel tank or other container. The primary cap member 2 is provided with a closely spaced series of scribed grooves 22 for use in rotating the member by frictional gripping action exerted either by the palm of the hand or possibly by a rubber shoe worn by an attendant. The lines or grooves 22 form an arrowhead or pointer formation as at 22', to indicate by means of the legends Closed and Open the relative position of the cap member 2 with respect to the cap member 3 and cap adapter 1.

Figure 1:
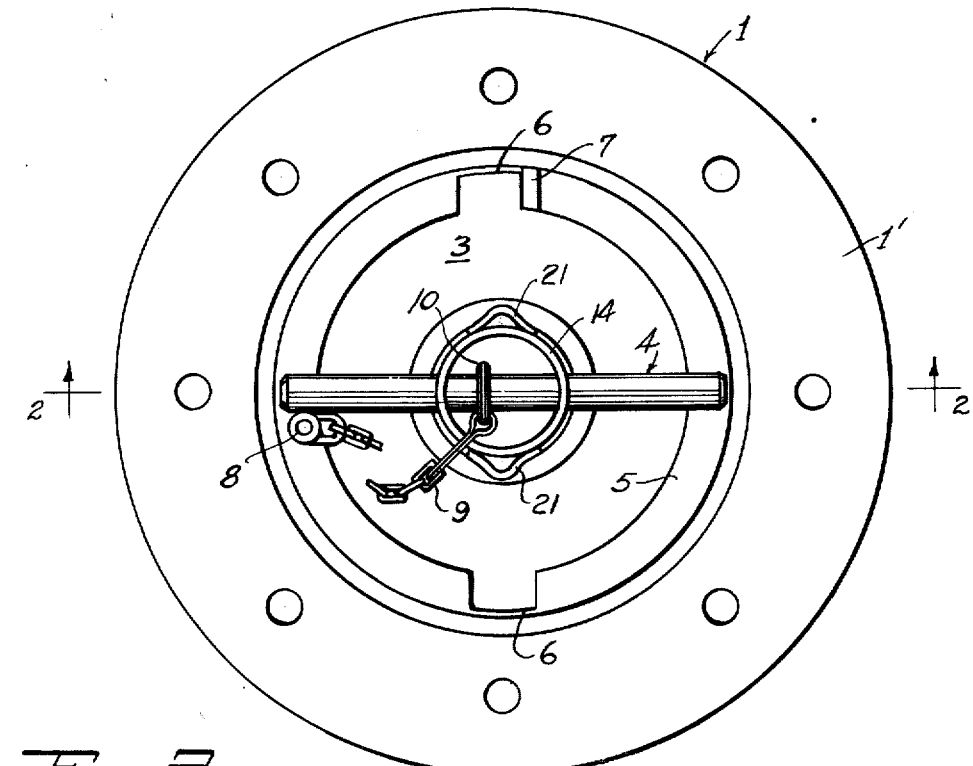
Fig. 1 is a bottom plan view of the filler cap and cap adapter constructed according to present invention.

For a description of the manner of using and operating the present cap it will be assumed that the parts are in the closed position as shown in Figs. 1, 2 and 3. The spring 19 functions to force the sealing ring or gasket 17 into tight engagement with the contiguous portions of cap members 2 and 3 and also exerts a downward force on the cap member 3 so as to maintain the gasket 12 under compression. Moreover it is preferred to maintain the spring 19 completely collapsed in the Closed position, so that internal pressure tending to lift the cap member 3 off its sealing engagement with the gasket 12 and shoulder 11 will not result in further compression of spring 19 and consequent lifting of cap member 3. However some lifting of the member 3 will take place when the internal pressure rises sufficiently, due to compression of the ring 17, but since the gasket 12 is under considerable compression it will merely expand and still maintain a tight joint between flange 3' and shoulder 11. Compression of the gasket 12 takes place in bringing the cap members to Closed position and due to the nature of gasket 12 this compression mostly compresses or flattens the air spaces in the gasket without deforming or spreading the gasket laterally.

For removal of the cap the attendant must exert some downward pressure on the cap member 2 and at the same time exert a turning action thereon so as to bring the scribed grooves 22 in line with the legend Open. By pressing downward in turning the cap, the locking pin 4 may more easily pass over the undulations on the lower surface of the locking flange 5. As soon as the arrowhead formation 22' points toward the legend Open, or as soon as the locking pin reaches the notches 6, the locking pin 4 is then free to move into the opposite notches 21 in the lower end of cap member 3. As a result the cap member 2 rises up above the surface of the adapter 1 an amount equal to the depth of notches 21, under the expansive force of coil spring 19. This rise is not only an indication that the cap is in the open or unlocked condition, but also permits the attendant to grasp the cap member 2 around the edges of the closure portion 13 thereof for removing the cap assembly from the adapter. The locking pin 4 is now retained at the bottom of notches 21 with the spring 19 in an expanded condition and with the lower end of cap member 3 extending about even with the lower end of post 14.

In replacing the cap assembly the attendant drops the assembly into the hollow adapter with the grooves 22 pointing to the legend Open and the ends of locking pin 4 will be over the notches 6 of flange 5. Then by pressing down on the cap member 2 and simultaneously turning it in a direction to bring the grooves 22 toward the legend Closed the locking pin 4 is made to pass below the flange 5 and turn into the position of Fig. 1. The downward pressure serves to frictionally retain the secondary cap member 3 in the position taken upon insertion of the cap assembly into the adapter 1, so that the locking pin 4 is rotated away from the notches 21 in cap member 3 as the primary cap member 2 is rotated. Thus it may be seen that the secondary cap member 3 never rotates on opening or closing the cap assembly and there is no chance of chafing or tearing the relatively soft gasket 12. While this gasket is preferably mounted on the cap member 3, it may just as well be permanently connected to the adapter 1 in the position shown (Fig. 2) if this alternative is preferred.

The filler cap and adapter as described and illustrated embodies numerous advantageous features which may be summarized as follows. The double gasket in combination with the two relatively movable cap members makes possible an efficient fluid sealing action. Any tendency for the secondary cap member 3 to lift under internal fluid pressure will not destroy the sealing action of gasket 12 because it is a highly compressible gasket, and will not destroy the sealing action of the rubber ring 17 because of the wedging action exerted by contiguous portions of cap members 2 and 3. The relative sliding and rotative movement between the members 2 and 3 permits the primary cap member to extend above the surface of the adapter 1 when the locking pin 4 reaches the notches 6, thus serving as a warning that the cap is not secure at any time it is observed that the closure portion 13 of member 2 is not down flush with adapter 1. Also the friction grooves 22 serve as a further positive indication of the condition of the cap assembly by their relation to the legends Open and Closed. Further the presence of undulations on the lower surface of locking flange 5 provides greater security, since the locking pin 4 will always tend to seek a low point and retain the cap secure even if locking pin 4 has not been turned to the final locked position as shown in Fig. 1. A further feature which makes assembly of the structure more precise is the provision of the shallow notches 15 in the locking pin 4 to correctly locate the pin in the hollow post 14. As the pin is inserted with the notches 15 facing toward the lower end of post 14, the cap member 3 acted on by spring 19 exerts a downward force on the pin. Then when the notches 15 reach the proper location the spring force causes interfitting engagement of the notches 15 and wall portions of the post 14. To make the pin secure in the post it is preferred to make a light weld between the parts at the opposite wall portions of the post 14. The locking pin 4 is preferably a solid bar of circular cross section but its shape and form may be varied according to choice or circumstance.

It is further noted that the coil spring 19 has two important functions in the completely assembled filler cap. First, it compresses and wedges the rubber O-ring 17 into tight engagement with the flared wall portion 16 and the adjacent central post 14. Second, it exerts a constant inward force on the secondary cap member 3 which thus causes compression of the soft gasket 12 between the flange 3' of member 3 and the annular shoulder 11 of the adapter 1. Any lifting of the secondary cap member 3 by the action of internal pressure is limited by the extent to which the spring 19 may collapse and by the extent to which the O-ring 17 may further compress. However as noted above the spring 19 is preferably maintained completely collapsed in the closed position of the cap, so that lifting of the secondary cap member by internal pressure will be limited by the further compression of ring 17. Thus it is seen that the ring 17 should be made of a yieldable material which is less compressible than the material of gasket 12, so that the sealing action at the gasket 12 will be maintained. It is especially noted that no bending of the locking pin 4 is possible to allow further lifting of the cap structure, because the pin is purposely made very rigid.

The embodiments of the invention herein shown and described are to be regarded as illustrative only and it is to be understood that the invention is susceptible to variations, modifications and changes within the scope of the appended claims.

I claim:

1. In a fluid storage container having an opening formed in one wall to provide access to the interior thereof, an adapter secured in said opening and having an inwardly extending cylindrical wall portion terminating in a notched circular flange, a circular gasket-seating shoulder on said cylindrical wall portion facing toward the outside of said container, a primary cap member having an outer disk-like wall portion adapted to be received within said adapter in flush relation with respect to the outer end thereof and having an inwardly extending post centrally thereof, a transverse locking pin at the inner end of said post adapted to pass below said notched circular flange and on rotation of said primary cap member being adapted to be retained below said flange by locking contact therewith, a secondary cap member slidably embracing said inwardly extending post outwardly of said locking pin and having a peripheral gasket-seating flange adapted to contact a resilient gasket also engageable with said gasket-seating shoulder, an outwardly flared wall portion on said secondary cap member adjacent to said post, a resilient ring lodged in the annular space between said outwardly flared wall portion and said post and engaging said wall portion and post along its outer and inner edges respectively, and a coil spring around said post between said ring and said disk-like wall portion of said primary cap member to compress said ring axially and also force it into wedging relation between said outwardly flared wall portion and said post.

2. In a fluid storage container having an opening formed in one wall to provide access to the interior thereof, an adapter secured in said opening and having an inwardly extending cylindrical wall portion terminating in a notched circular flange, a cylindrical gasket-seating shoulder on said circular wall portion facing toward the outside of said container, a primary cap member having an outer disk-like wall portion adapted to be received within said adapter in flush relation with respect to the outer end thereof and having an inwardly extending post centrally thereof, a transverse locking pin at the inner end of said post extending laterally on opposite sides thereof and being adapted to pass below said notched circular flange and on rotation of said primary cap member being adapted to be retained below said flange by locking contact therewith, a secondary cap member slidably and rotatably embracing said inwardly extending post outwardly of said locking pin and having a gasket-seating flange adapted to contact a resilient gasket also engageable with said gasket-seating shoulder, means providing opposite notches at the inner end of said secondary cap member to receive opposite end portions of said locking pin in the unlocked position thereof and thus allow elevation of said disk-like wall portion as an indication of the unlocked condition of said locking pin, an outwardly flared wall portion on said secondary cap member adjacent to said post, a resilient ring lodged in the annular space between said outwardly flared wall portion and said post and engaging said wall portion and post along its outer and inner edges respectively, and a coil spring around said post between said ring and said disk-like wall portion of said primary cap member to compress said ring axially and also force it into wedging relation between said outwardly flared wall portion and said post.

3. In a fluid storage container having an opening formed in one wall to provide access to the interior thereof, an adapter secured in said opening and having an inwardly extending cylindrical wall portion terminating in a notched circular flange, a circular gasket-seating shoulder on said cylindrical wall portion facing toward the outside of said container, a primary cap member having an outer disk-like wall portion adapted to be received within said adapter in flush relation with respect to the outer end thereof and having an inwardly extending post centrally thereof, a transverse locking pin at the inner end of said post adapted to pass below said notched circular flange and on rotation of said primary cap member being adapted to be retained below said flange by locking contact therewith, a secondary cap member slidably embracing said inwardly extending post outwardly of said locking pin and having a peripheral gasket-seating flange adapted to contact a resilient gasket also engageable with said gasket-seating shoulder, an outwardly flared wall portion on said secondary cap member adjacent to said post, a coil spring around said post between said outwardly flared wall portion on said secondary cap member and said disk-like wall portion of said primary cap member, and said coil spring being completely collapsed when said cap members are installed and said locking pin is below said notched circular flange so that lifting of said secondary cap member by internal pressure in said container will be held to a minimum.

4. In a fluid storage container having an opening formed in one wall to provide access to the interior thereof, an adapter secured in said opening and having an inwardly extending cylindrical wall portion terminating in a notched circular flange, a cylindrical gasket-seating shoulder on said circular wall portion facing toward the outside of said container, a primary cap member having an outer disk-like wall portion adapted to be received within said adapter in flush relation with respect to the outer end thereof and having an inwardly extending post centrally thereof, a transverse locking pin at the inner end of said post extending laterally on opposite sides thereof to the same extent and being adapted to pass below said notched circular flange and on rotation of said primary cap member being adapted to be retained below said flange by locking contact therewith, a secondary cap member slidably and rotatably embracing said inwardly extending post outwardly of said locking pin and having a gasket-seating flange adapted to contact a resilient gasket also engageable with said gasket-seating shoulder, means providing opposite notches at the inner end of said secondary cap member to receive opposite portions of said locking pin in the unlocked position of said locking pin wherein said pin coincides with the notches of said notched circular flange and thus allow elevation of said disk-like wall portion as an indication of the unlocked condition of said locking pin, an outwardly flared wall portion on said secondary cap member adjacent to said post, and a coil spring around said post between said outwardly flared wall portion on said secondary cap member and said disk-like wall portion of said primary cap member.

5. In a fluid storage container having an opening formed in one wall to provide access to the interior thereof, an adapter secured in said opening and having an inwardly extending cylindrical wall portion terminating in a notched circular flange, a circular gasket-seating shoulder on said cylindrical wall portion facing toward the outside of said container, a primary cap member having an outer disk-like wall portion adapted to be received within said adapter in flush relation with respect to the outer end thereof and having an inwardly extending post centrally thereof, a rigid transverse locking means at the inner end of said post projecting on opposite sides thereof and adapted to pass below said notched circular flange and on rotation of said primary cap member being adapted to be retained below said flange by locking contact therewith, a circular secondary cap member slidably mounted on said post between said transverse locking means and said primary cap member and having a peripheral gasket-seating flange outwardly of said gasket-seating shoulder, a compressible circular gasket between said gasket-seating flange and said gasket-seating shoulder, a compression coil spring mounted on said post to bias said secondary cap member away from said primary cap member and with the cap members installed within said adapter and said locking means below said notched circular flange said spring being adapted to compress said gasket between said gasket-seating flange and said gasket-seating shoulder, a resilient sealing ring closely surrounding said post and pressed by said spring into engagement with an adjacent portion of said secondary cap member to prevent leakage of fluid between said post and said secondary cap member, and said spring being completely collapsed when said cap members are installed and said locking means is below said notched circular flange so that internal pressure on said secondary cap member can decompress said gasket only to the extent that said sealing ring can be further compressed by movement of said secondary cap member toward said primary cap member.

6. In a combination of elements as recited in claim 5, said compressible gasket being made of uni-cellular sponge rubber and said resilient sealing ring being made of rubber which is less compressible than that of the compressible gasket.

7. In a fluid storage container having an opening formed in one wall to provide access to the interior thereof, an adapter secured in said opening and having an inwardly extending cylindrical wall portion terminating in a notched circular flange, a circular gasket-seating shoulder on said cylindrical wall portion facing toward the outside of said container, a primary cap member having an outer disk-like wall portion adapted to be received within said adapter in flush relation with respect to the outer end thereof and having an inwardly extending post centrally thereof, a rigid transverse locking means at the inner end of said post projecting on opposite sides thereof and adapted to pass below said notched circular flange and on rotation of said primary cap member being adapted to be retained below said flange by locking contact therewith, a circular secondary cap member slidably and rotatably mounted on said post between said tranverse locking means and said primary cap member and having a peripheral gasket-seating flange outwardly of said gasket-seating shoulder, a compressible circular gasket between said gasket-seating flange and said gasket-seating shoulder, a compression coil spring mounted on said post to bias said secondary cap member away from said primary cap member and with the cap members installed within said adapter and said locking means below said notched circular flange said spring being adapted to compress said gasket between said gasket-seating flange and said gasket-seating shoulder, a resilient sealing ring closely surrounding said post and pressed by said spring into engagement with an adjacent portion of said secondary cap member, and means providing clearance between said locking means and the inner end of said secondary cap member to allow elevation of said disk-like wall portion when said locking means is located in register with the notches of said notched circular flange by action of said coil spring to thus indicate the unlocked condition of said locking means and said cap members.

HOWARD NOYES.

REFERENCES CITED

The following references are of record in the file of this patent:

UNITED STATES PATENTS

| Number | Name | Date |
|---|---|---|
| 1,786,721 | Reid | Dec. 30, 1930 |
| 1,887,700 | Stevens | Nov. 15, 1932 |
| 2,316,507 | Dykeman | Apr. 13, 1943 |
| 2,346,723 | Brown | Apr. 18, 1944 |
| 2,395,695 | Summers | Feb. 26, 1946 |

FOREIGN PATENTS

| Number | Country | Date |
|---|---|---|
| 337,470 | France | 1903 |